Nov. 4, 1969  D. V. BURRELL  3,476,343
CLIPS FOR USE IN ANCHORING OUTLET AND SWITCH BOXES
Filed March 9, 1967  2 Sheets-Sheet 1
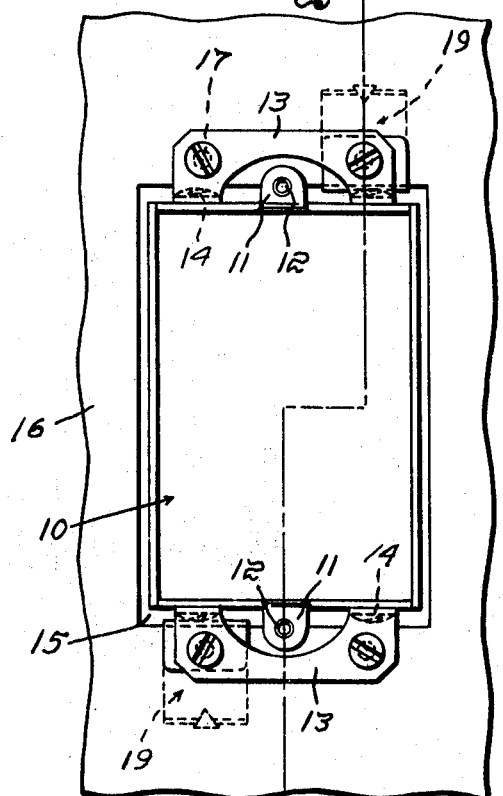
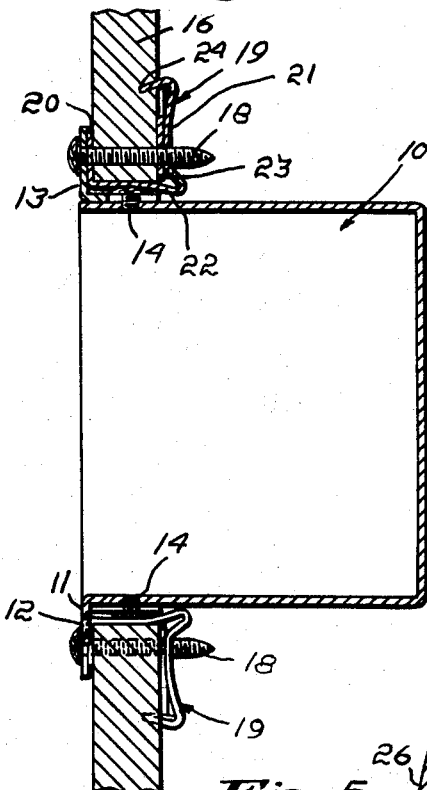
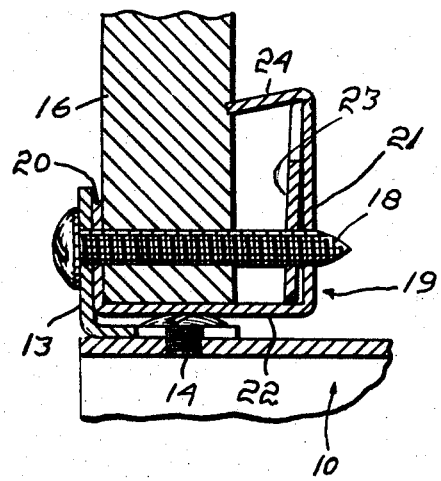
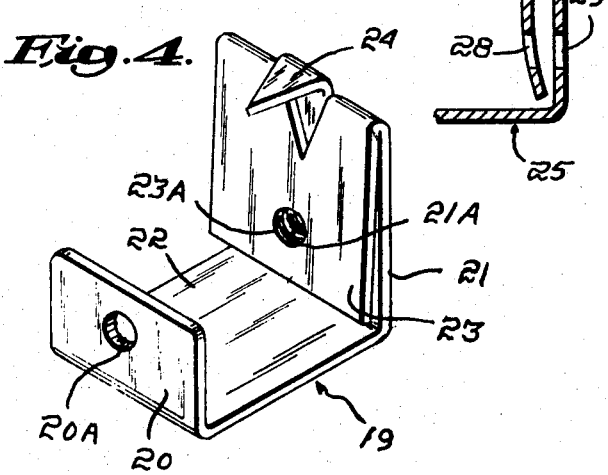
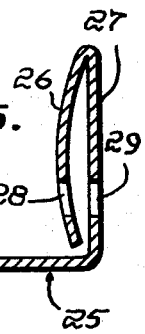
Inventor:
Donald V. Burrell,
by Abbott Spear,
Attorney Nov. 4, 1969  D. V. BURRELL  3,476,343
CLIPS FOR USE IN ANCHORING OUTLET AND SWITCH BOXES
Filed March 9, 1967  2 Sheets-Sheet 2
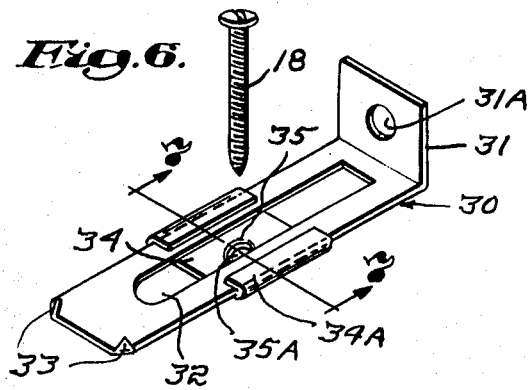
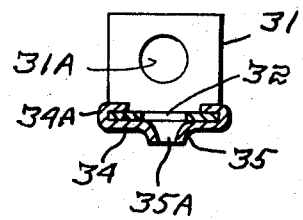
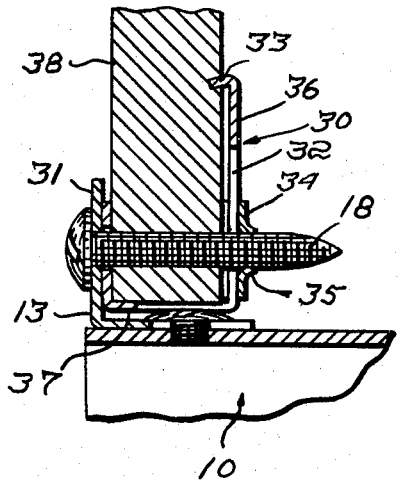
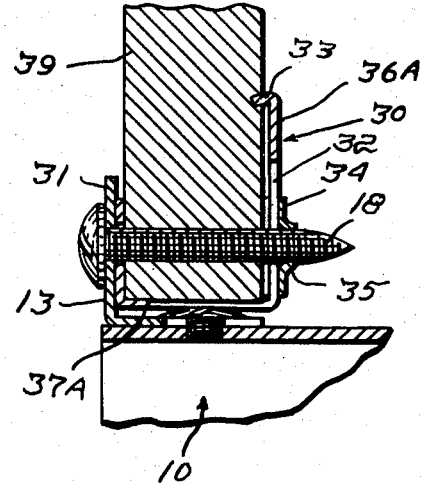
Inventor:
Donald V. Burrell,
by Abb G Spear,
Attorney United States Patent Office 3,476,343
Patented Nov. 4, 1969

3,476,343
CLIPS FOR USE IN ANCHORING OUTLET AND SWITCH BOXES
Donald V. Burrell, 7 Roberts St., Falmouth, Maine 04105
Filed Mar. 9, 1967, Ser. No. 621,877
Int. Cl. H02g 3/08
U.S. Cl. 248—216
11 Claims

ABSTRACT OF THE DISCLOSURE

A U-shaped clip of thin yieldable stock dimensioned to straddle a fragile wall layer at the edge of the box-receiving cut-out therein with an anchoring screw extending inwardly through the box flange, wall layer and the clip walls and drawing the inner clip wall into tight clamping engagement with the wall layer of the building, the inner clip wall including a plurality of layers.

---

The mounting of outlet and switch boxes in walls is frequently a troublesome operation when anchoring screws must be anchored in a wall layer that is so fragile that it may be fractured by the entry of or by an appreciable pull on such a screw. This problem has been recognized, but not successfully solved, since the various proposals contemplated special boxes.

The general objective of the invention is to provide clips that may be used with a conventional outlet and switch box to attach it quickly, easily, and securely to the wall marginally of the opening cut therein to accommodate it even though the wall layer is of a material that is easily fractured by a screw entering it. In accordance with the invention this objective is attained with a U-shaped clip of thin, flexible stock having inner and outer walls and a connecting web spacing the clip walls apart to receive between them a wall layer within a particular thickness range. The outer clip wall has a hole dimensioned to receive the attaching screw freely when the clip has been positioned along an edge of the wall opening to underlie a marginal box flange with their holes registering thus to enable a screw to be entered therethrough and then to pass through the wall layer and into a hole in the inner clip wall dimensioned to receive the screw so that it functions as a nut to enable the clip wall to be drawn into clamping engagement with the wall layer.

The clip stock is sufficiently thin so that its use does not cause any objectionable build-up under the box flange and so that the clip is yieldable to enable the inner clip wall to be drawn against the wall layer. At the same time, the inner clip wall must be capable of holding the screw and of functioning as a clamping washer of sufficient area to protect the wall layer. This result is attained in accordance with the invention, by providing that the inner clip wall consists of a plurality of layers that may be provided by a folded end portion or by a separate nut member attached to the inner clip wall, desirably in a slidable manner particularly when the clip is to be adjustable for use with wall layers of different thicknesses.

In the accompanying drawings, there are shown illustrative embodiments of the invention from which these and other of its objectives, novel features and advantages of the invention will be readily apparent.

In the drawings:

FIGURE 1 is a front view of an outlet box installation utilizing clips in accordance with the invention, FIGURE 2 is a section taken approximately along the indicated lines 2—2 of FIGURE 1, FIGURE 3 is a section corresponding to that through the uppermost clip in FIGURE 2, but on an increased scale and showing the clip in a partly anchored position, FIGURE 4 is a perspective view of one of the clips on the scale of FIGURE 3, FIGURE 5 is a fragmentary section view illustrating the inner wall of a clip in accordance with another embodiment of the invention, FIGURE 6 is a perspective view of a clip in accordance with yet another embodiment of the invention, FIGURE 7 is a section taken approximately along the indicated lines 7—7 of FIGURE 6, FIGURE 8 is a fragmentary section through an attached clip adjusted for use with a particular wall layer, and FIGURE 9 is a similar view but with the clip adjusted to a somewhat thicker wall layer.

A conventional outlet or switch box is generally indicated at 10 and is shown as having a flange 11 at each end provided with a threaded bore 12 to enable the support, not shown, for outlet switches or combinations thereof, to be secured after the leads have been connected thereto. The outlet box 10 is also shown as having flanges 13 detachably attached to its end walls as by screws 14, the flanges 13 being dimensioned to overlie the margins of an opening 15 cut in the wall 16 to receive the box 10 and provided with holes 17 for screws 18 by which the box 10 is to be secured in place.

While such boxes are used with various wall constructions, the wall 16 is shown as of a single layer, wall board type and most wall board materials are easily broken by the attaching screw 18 which of necessity must enter the wall material close to the opening 15.

In accordance with the invention, clips, generally indicated at 19 and formed, for example, from thin, flexible stock such as soft malleable steel in the neighborhood of 26 gauge, are U-shaped and each clip thus has an outer wall 20 and an inner wall 21, and a connecting web 22. The inner wall 21 has an end portion 23 folded inwardly towards the web 22 and a pointed tab or barb 24 cut therefrom with its base approximately at the junction of the inner wall 21 and with its point inwardly disposed and inclined slightly in the direction of the web 22.

The outer wall 20 has a hole 20A dimensioned freely to receive a screw 18 and the inner wall 21 and its end portion 23 have holes 21A and 23A, respectively, that are alined therewith but are somewhat smaller so that the screw entering them will have a threaded engagement therewith, the double inner wall thickness ensuring that it can hold the screw 18.

In practice, the distance between the barb 24 and the free edge of the end portion 23 are both closer to the outer clip wall 20 than the inner clip wall 21. Each clip may then be slipped over the margin of the wall 16 at an edge of the box-receiving opening 15 in a position to underlie a box flange 13 with the hole 20A of its outer wall 20 in registry with one of the holes 17 thereof. With a wall thickness equal to or less than the length of the web 22 but more than the distance between the end portion 23, the tab 24, or both, the clip is held in its selected position until a screw 18 can be so advanced through the clip holes and the intervening part of the wall as to draw the inner wall 21 into clamping relation thereto. The inner clip wall 21 is of greater area than the outer clip wall 20 and thus has adequate area to serve as a protective washer. With a wall layer whose thickness is less than the dimensions of the web 22, the web 22 buckles against the head of the adjacent screw 14 further to increase the tightness with which the box 10 is held.

In FIGURE 5, the generally indicated clip 25 has its infolded end portion 26 centrally bowed for frictional, position-holding engagement with the wall layer 16. The screw gripping holes in the end portion 26 and inner wall 27 are indicated at 28 and 29, respectively.

In the embodiment of the invention illustrated by FIGURES 6–9, the generally indicated clip 30 is formed from a strip of suitably thin and flexible stock to provide an outer wall 31 having a hole 31A dimensioned to receiver a screw 18 freely. The clip is also provided with a slot 32 extending lengthwise of the major portion of the remainder of its clip 30 with its ends shown as inturned as at 33 to retain the slidable nut 34 and also to provide barbs for temporarily anchoring the clip 30 in position. The nut 34 has marginal channels 34A receiving the margins of the clip 30 and is formed with a concavity 35 having a hole 35A centrally thereof dimensioned to have a threaded engagement with the screw 18, the slot 32 being shown as of a width such as not to be engaged thereby. The nut 34 may be of considerably heavier stock than the clip 30 and it will be noted that the slot 32 makes the clip 30 easier to bend when its U-shaped form is to be established by the user.

In the preferred use of the clip 30, the inner clip wall 36 is formed by bending the clip 30 to complete its U-shaped form with a web 37 of a length appropriate for the thickness of the wall layer with which it is to be used. The wall layer 38 shown in FIGURE 8 is thinner than the wall layer 39 of FIGURE 9. As a consequence the web 37 of the clip shown in FIGURE 8 is shorter than the web 37A of the clip of FIGURE 9 and the inner wall 36 of the former is longer than the inner wall 36A of the latter. The nut 34 is, of course, slidable into any position required by the web length. In this connection, the nut concavity 35 is of assistance in ensuring the entry of a screw 18 into the aperture 35A.

While other screws can be used in any of the embodiments of the invention, those of the self-tapping type are preferred.

From the foregoing, it will be apparent that clips in accordance with the invention are well adapted to meet the requirements of both production and use and enable conventional switch and outlet boxes to be properly secured with ease and convenience.

I claim:

1. A clip of thin, flexible stock for use with a screw in anchoring a box such as an outlet or switch box in an opening in a wall of a type having a layer that is easily fractured and the outlet box being of the type having oppositely disposed marginal flanges each having a hole dimensioned freely to receive said screw, said clip being U-shaped and providing inner and outer walls and a connecting web spacing the clip walls apart to receive between them a wall layer within a particular thickness range, the inner clip wall including a plurality of layers for engagement with the inner surface of the wall layer, said clip walls having alined holes, the hole in the outer wall being dimensioned to receive said screw freely, one layer of the inner clip wall functioning as a screw-receiving washer engageable with the inner surface of the wall layer and another as a screw-receiving nut as the screw is advanced therein after said clip has been placed along an edge portion of the wall opening with the outer clip wall positioned to underlie a marginal flange of said box with their holes in alignment thus to enable said screw to be entered therethrough and then to pass through the wall layer and into the hole in the inner wall, said clip being of sufficiently yieldable stock to enable said inner clip wall to be drawn into clamping engagement with said wall layer, the washer-establishing layer being an infolded end portion of the nut establishing layer and the inner wall includes a pointed tab disposed to catch in the wall layer.

2. The clip of claim 1 in which the pointed tab is located approximately at the fold line between the nut-establishing layer of the inner wall and the infolded end thereof.

3. The clip of claim 1 in which the washer-establishing layer is an infolded end portion of the nut-establishing layer and the infolded end portion includes a portion protruding towards the outer clip wall.

4. The clip of claim 3 in which the infolded end portion of the inner wall of the clip has a hole registering with the other clip holes.

5. The clip of claim 1 in which the layers of the inner wall are part of a unit slidably connected to another layer of the inner wall and the last named layer has an elongated slot through which the hole in the nut is exposed.

6. The clip of claim 5 in which the face of the nut disposed towards the inner face of the wall layer is concave.

7. A clip of thin, flexible stock for use with a screw in anchoring a box such as an outlet or switch box in an opening in a wall of a type having a layer that is easily fractured and the outlet box being of the type having oppositely disposed marginal flanges each having a hole dimensioned freely to receive one of said screws, said clip including an angularly disposed first portion having an aperture dimensioned freely to receive said screw and constituting the outer clip wall and an integral second portion having an aperture in the form of a lengthwise slot dimensioned to receive said screw and bendable to define with said first portion the inner wall of a U-shaped clip and a web between the clip walls and spacing them apart to receive between them a wall layer of a predetermined maximum thickness, and a member having an aperture and slidably attached to said second portion with its aperture rearwardly of but in alignment with the slot of the second portion and so receiving said screw as to become threaded thereon as a nut when said clip has been positioned along an edge portion of the wall opening with the outer clip wall positioned to underlie a marginal flange of said box with their holes in alignment thus to enable said screw to be entered therethrough and then to pass through the wall layer and into and through said apertures, said clip being of sufficiently yieldable stock to enable said inner clip wall to be drawn into clamping engagement with said wall layer and said inner clip wall being of such an area as to function as a clamping washer against the inner face of said wall layer.

8. The clip of claim 7 in which the member is of stock that is more rigid than that of which the clip is formed.

9. The clip of claim 7 in which the aperture of the second portion extends substantially from end-to-end thereof.

10. The clip of claim 7 in which the member includes marginal channels slidably receiving the margins of the second clip portion.

11. The clip of claim 10 and the free end of the second clip portion including bends which with the outer clip end portion retain the member as limits to its sliding movement.

References Cited

UNITED STATES PATENTS

| | | | |
|---|---|---|---|
| 1,200,877 | 10/1916 | Sable | 248—343 |
| 1,564,609 | 12/1925 | Morgenstern | 248—343 |
| 1,617,184 | 2/1927 | Spott | 248—343 |
| 1,818,317 | 8/1931 | Gilmore | 248—27 X |
| 2,309,189 | 1/1943 | Hancock et al. | 220—3.6 |
| 2,334,799 | 11/1943 | Thompson | 220—3.6 |
| 2,970,713 | 2/1961 | Kellberg | 220—3.6 |
| 2,973,175 | 2/1961 | Appleton | 248—216 |

ROY D. FRAZIER, Primary Examiner

J. F. FOSS, Assistant Examiner

U.S. Cl. X.R.

220—3.6; 248—27